(12) United States Patent
Nishimura et al.

(10) Patent No.: US 8,201,873 B2
(45) Date of Patent: Jun. 19, 2012

(54) BODY STRUCTURE OF VEHICLE

(75) Inventors: Yoshikazu Nishimura, Hiroshima (JP); Manabu Hashimoto, Hiroshima (JP)

(73) Assignee: Mazda Motor Corporation (JP)

( * ) Notice: Subject to any disclaimer, the term of this patent is extended or adjusted under 35 U.S.C. 154(b) by 69 days.

(21) Appl. No.: 12/828,044

(22) Filed: Jun. 30, 2010

(65) Prior Publication Data
US 2011/0031781 A1 Feb. 10, 2011

(30) Foreign Application Priority Data
Aug. 6, 2009 (JP) .................. 2009-183324

(51) Int. Cl.
*B60N 3/00* (2006.01)
(52) U.S. Cl. .............................. 296/193.06
(58) Field of Classification Search ............. 296/187.01, 296/187.03, 187.09, 187.1, 187.12, 193.01, 296/193.05, 193.06, 193.09, 203.01, 203.03, 296/29, 30
See application file for complete search history.

(56) References Cited

U.S. PATENT DOCUMENTS

| | | | | |
|---|---|---|---|---|
| 6,075,992 A * | 6/2000 | Moon et al. | ................... | 455/455 |
| 7,651,158 B2 * | 1/2010 | Koizumi et al. | ......... | 296/203.02 |
| 7,845,716 B2 * | 12/2010 | Kiyotake et al. | ......... | 296/203.02 |
| 7,887,122 B2 * | 2/2011 | Baccouche et al. | ...... | 296/187.09 |
| 7,887,123 B2 * | 2/2011 | Honji et al. | .............. | 296/187.09 |
| 8,002,337 B2 * | 8/2011 | Baccouche et al. | ...... | 296/203.02 |

FOREIGN PATENT DOCUMENTS
JP 2003-182633 A 7/2003
* cited by examiner

*Primary Examiner* — Lori Lyjak
(74) *Attorney, Agent, or Firm* — Studebaker & Brackett PC; Donald R. Studebaker (57) ABSTRACT

A hinge reinforcement is provided at a hinge pillar at a specified position which corresponds to an upper door-hinge attachment portion. Attachment portions which extend toward a hinge pillar inner and are attached to this hinge pillar inner are provided at the hinge reinforcement which corresponds to the upper door-hinge attachment portion. A branch frame and a gusset member which transmit an impact load inputted from a front side frame extending in a vehicle longitudinal direction to the attachment portions via the hinge pillar inner are provided so as to extend from the front side frame. Accordingly, the impact load inputted to the vehicle body at the vehicle collision can be properly transmitted to the vehicle rear portion, so that the deformation of the vehicle compartment can be restrained surely.

13 Claims, 10 Drawing Sheets

BODY STRUCTURE OF VEHICLE

BACKGROUND OF THE INVENTION

The present invention relates to a body structure of a vehicle comprising a hinge pillar including door-hinge attachment portions which are provided for upper and lower door hinges.

Conventionally, the body structure of a vehicle disclosed in Japanese Patent Laid-Open Publication No. 2003-182633, for example, is known. This body structure of a vehicle comprises the front pillar, the front side frame which extends in the vehicle longitudinal direction, and the reinforcing member which extends obliquely upward and outward from the disposition position of the suspension tower of the font side frame along the suspension tower so as to connect the rear portion of the apron upper member in front of the front pillar and the inward end portion of the cowl side.

According to the body structure disclosed in this publication, an impact load inputted to the vehicle body at a vehicle frontal collision can be transmitted or dispersed from the front side frame to the front pillar via the reinforcing member and the cowl side.

However, since the conventional structure disclosed in the above-described publication merely transmits or disperses the impact load to the front pillar, this transmission or dispersion of the impact load may not be made efficient only by the above-described reinforcing member. Thus, the above-described conventional structure was insufficient to restrain deformation of the vehicle compartment surely.

SUMMARY OF THE INVENTION

An object of the present invention is to provide a body structure of a vehicle which can properly transmit the impact load inputted to the vehicle body at the vehicle collision to the vehicle rear portion, thereby restrain the deformation of the vehicle compartment surely.

According to the present invention, there is provided a body structure of a vehicle, comprising a hinge pillar including door-hinge attachment portions which are provided for upper and lower door hinges, a hinge reinforcement provided at the hinge pillar at a specified position which corresponds to the upper door-hinge attachment portion, the hinge reinforcement including an inner-panel attachment portion which extends toward an inner panel of the hinge pillar and to which the inner panel of the hinge pillar is attached, and an impact-load transmitting member connecting a front side frame which extends in a vehicle longitudinal direction and the inner-panel attachment portion of the hinge reinforcement to which the inner panel of the hinge pillar is attached.

According to the present invention, the impact load at the vehicle frontal collision or the like is transmitted to the inner-panel attachment portion of the hinge reinforcement, so that the impact load can be transmitted or dispersed to the vehicle rear portion properly. Thereby, the deformation of the vehicle compartment can be prevented surely.

According to an embodiment of the present invention, the body structure of a vehicle further comprises a dash panel which partitions an engine room from a vehicle compartment, wherein the impact-load transmitting member comprises a branch frame which connects the front side frame and the dash panel, and a gusset member which connects a branch-frame connection portion of the dash panel and the inner-panel attachment portion of the hinge reinforcement. Thereby, the impact load can be transmitted to the inner-panel attachment portion properly with the structure in which the dash panel extends in the vehicle width direction between the branch frame and the gusset member.

According to another embodiment of the present invention, the branch frame is arranged outside a wheel house. Thereby, the branch frame can be arranged by using the dead space, avoiding any interference with various members in the engine room. Further, the layout flexibility of the branch frame can be increased by using the dead space outside the wheel house. Thus, the passage of the impact-load transmission from the front side frame to the dash panel can be provided properly.

According to another embodiment of the present invention, a dash cross member is provided at the dash panel, and the branch frame and the gusset member are arranged on both sides of dash cross member so as to face to each other. Thereby, the connection portion of the branch frame and the gusset member can be reinforced by using the dash cross member extending in the vehicle width direction. Accordingly, deformation of the above-described connection portion can be restrained, so that the impact load can be properly transmitted to the branch frame to the gusset member.

According to another embodiment of the present invention, the body structure of a vehicle further comprises a door-side impact-load transmitting member which is arranged inside a door so as to extend rearward from the upper door hinge and connect to a second pillar which extends vertically behind the door. Thereby, the impact load inputted from the door hinge can be more properly received by the second pillar extending vertically, so that the deformation of the vehicle compartment can be restrained more surely.

According to another embodiment of the present invention, the door-side impact-load transmitting member comprises plural members which are arranged inside and outside the door hinge in a vehicle width direction, respectively. Thereby, the impact load inputted from the door hinge can be surely transmitted to the second pillar by dispersing it inside the door.

According to another embodiment of the present invention, the plural door-side impact-load transmitting members are arranged obliquely in a side view so that a vertical distance therebetween becomes greater toward a vehicle rear. Thereby, the impact load can be dispersed not only inside the door but above and below the door. Thus, the input range of the impact load at the second pillar extending vertically can be expanded vertically, so that the impact load can be received with a proper dispersion.

According to another embodiment of the present invention, an apron reinforcement which extends forward from an upper portion of the hinge pillar is provided substantially in parallel to the front side frame. Thereby, the impact load can be transmitted to the vehicle rear portion with the more proper dispersion, so that the impact-load transmission can be made efficient. Accordingly, the deformation of the vehicle compartment can be restrained more surely.

Other features, aspects, and advantages of the present invention will become apparent from the following description which refers to the accompanying drawings.

DETAILED DESCRIPTION OF THE INVENTION

Figure 1:
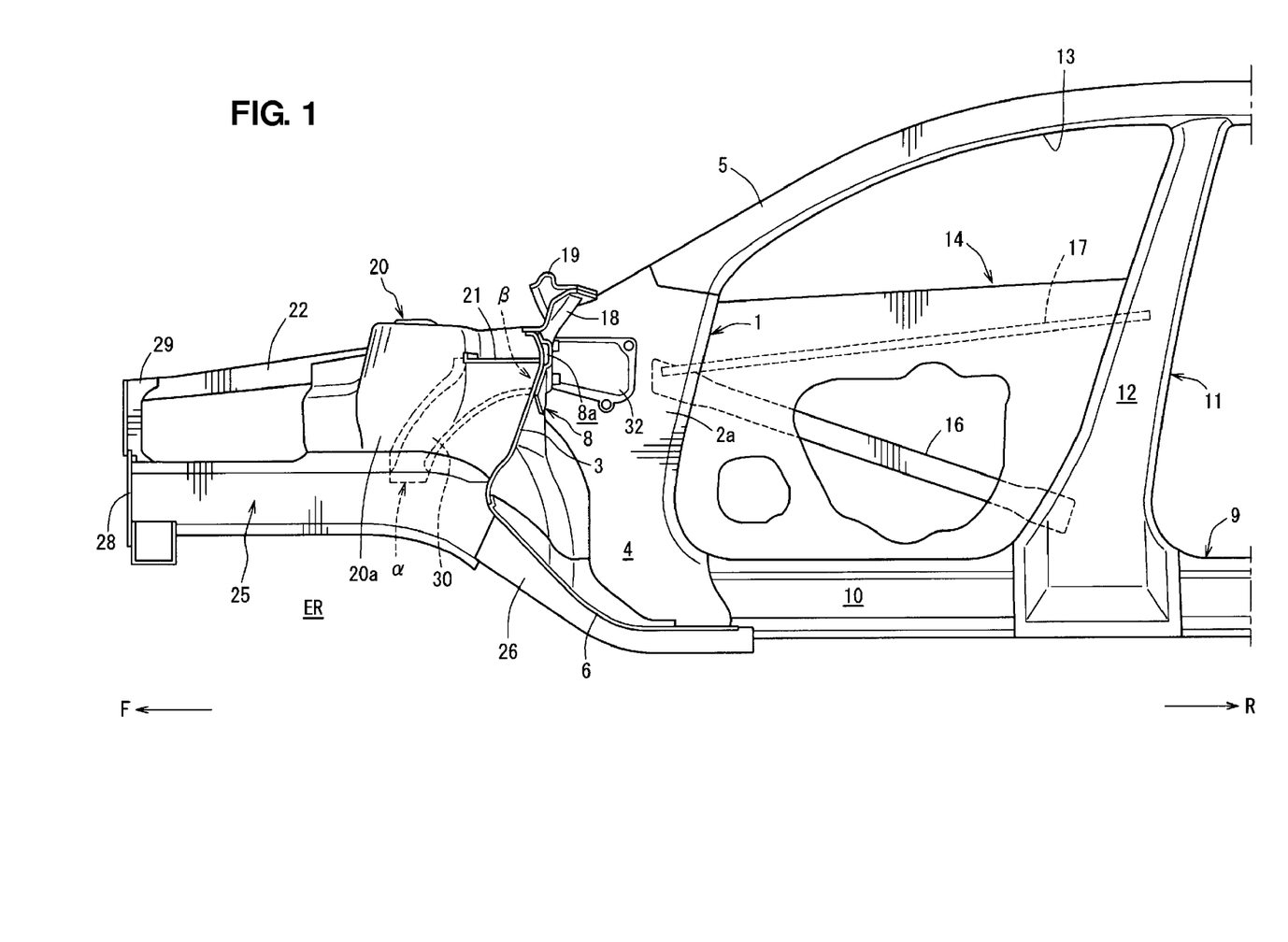
FIG. 1 is a side view showing a front body structure of a vehicle according to an embodiment of the present invention.
Figure 2:
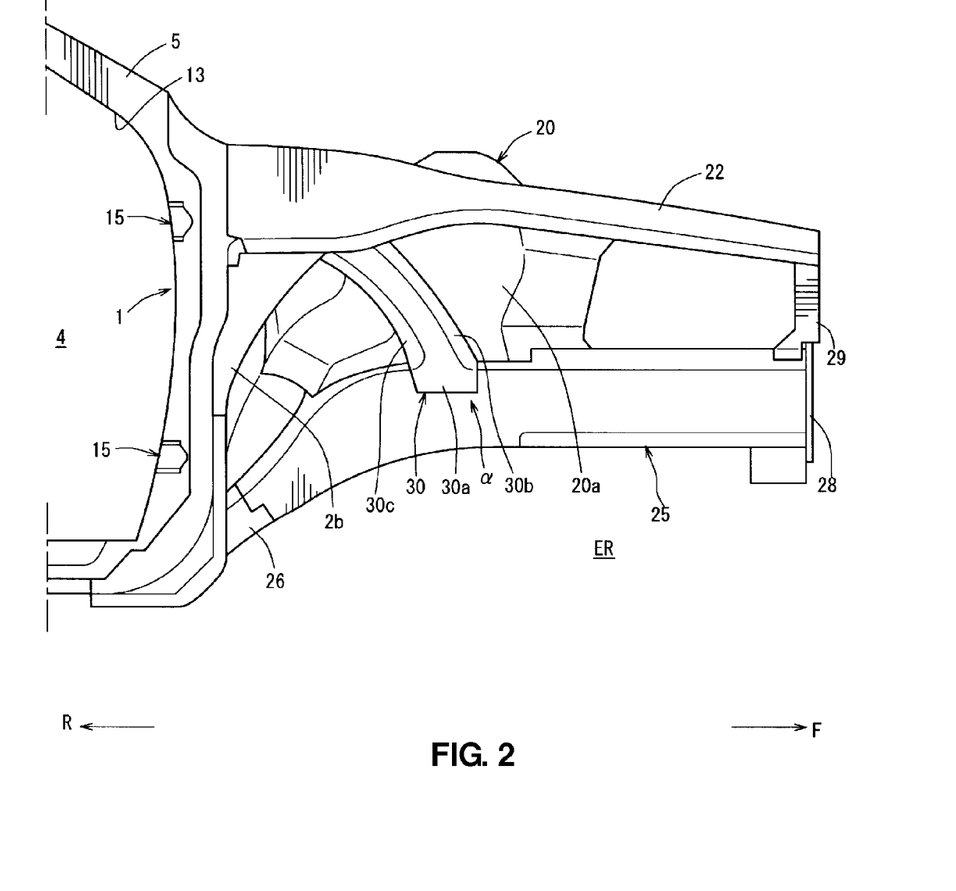
FIG. 2 is a side view of the front body structure of the vehicle of FIG. 1, when viewed from the vehicle outside.
Figure 3:
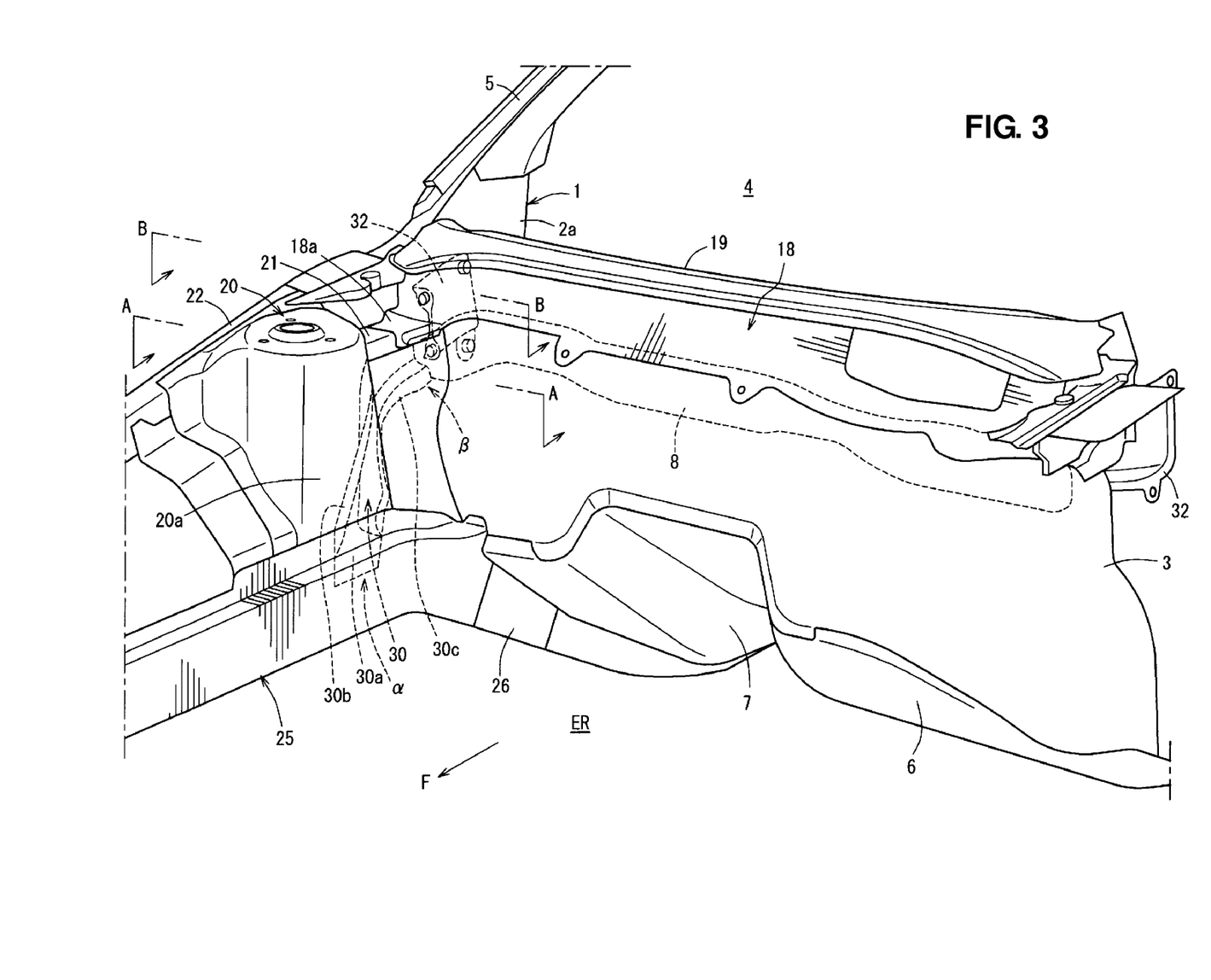
FIG. 3 is a perspective view of a major portion of FIG. 1.
Figure 4:
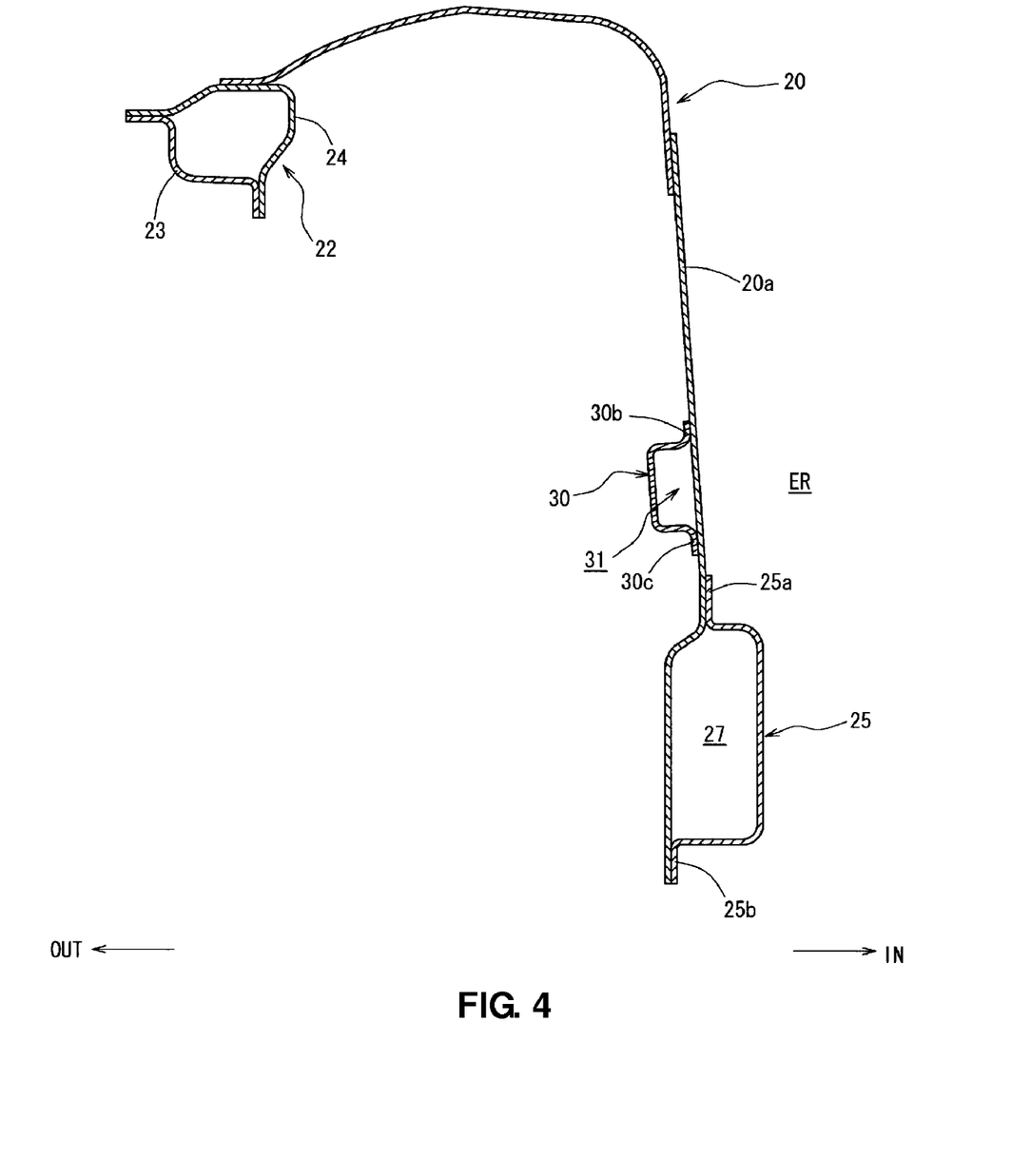
FIG. 4 is a sectional view taken along line A-A of FIG. 3.
Figure 5:
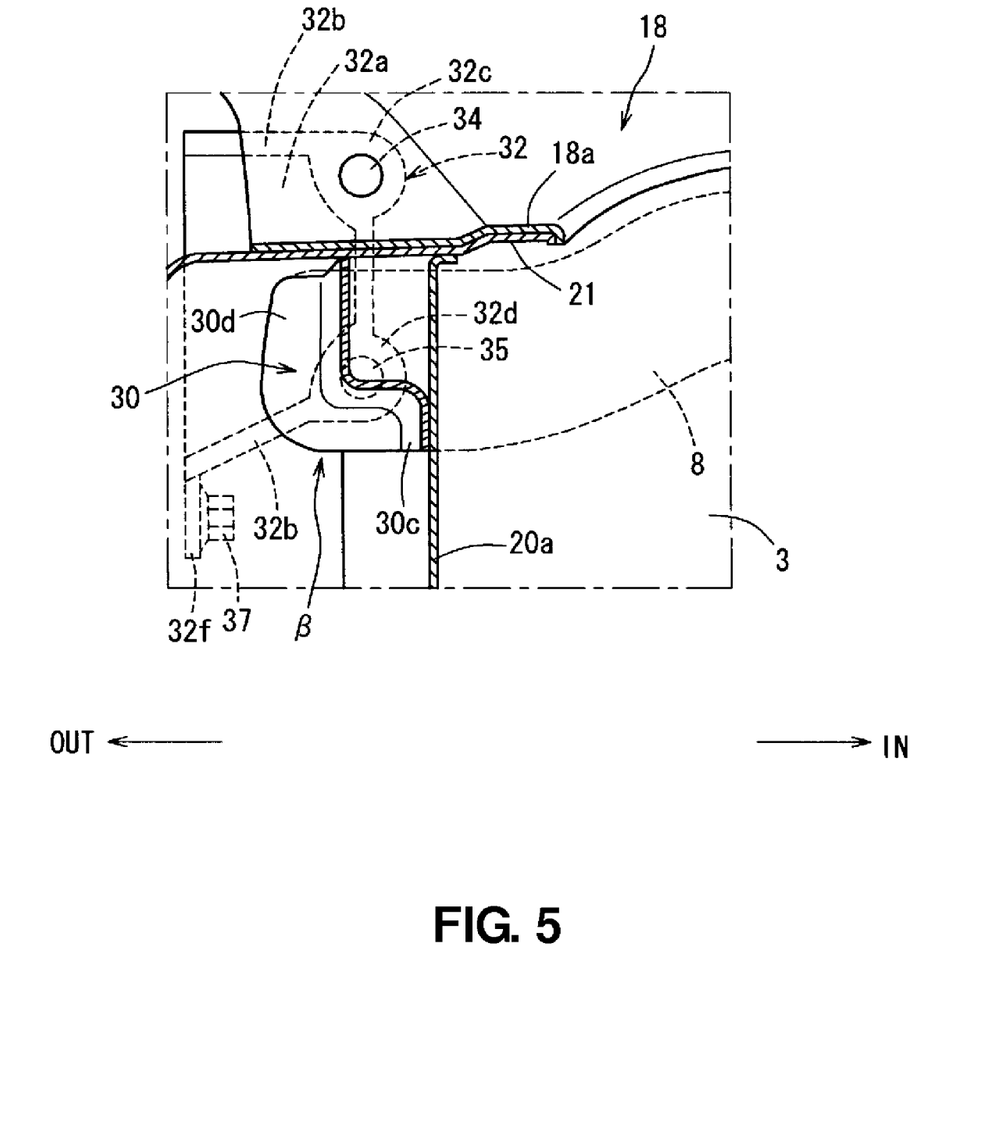
FIG. 5 is a sectional view taken along line B-B of FIG. 3.

Hereinafter, a preferred embodiment of the present invention will be described referring to the accompanying drawings. FIG. 1 is a side view showing a front body structure of a vehicle (when viewed from a middle portion in a vehicle width direction toward a vehicle outside), FIG. 2 is a side view of the front body structure of the vehicle of FIG. 1, when viewed from the vehicle outside, FIG. 3 is a perspective view of a major portion of FIG. 1, FIG. 4 is a sectional view taken along line A-A of FIG. 3, and FIG. 5 is a sectional view taken along line B-B of FIG. 3. Herein, an arrow F shows a vehicle forward direction, an arrow R shows a vehicle rearward direction, an arrow IN shows a vehicle inward direction, and an arrow OUT shows a vehicle outward direction.

A pair of right and left hinge pillars 1, 1 is provided as shown in FIGS. 1 and 2 (herein, only the right-side hinge pillar is illustrated). The hinge pillar 1 is a vehicle-body rigidity member which is formed by a hinge pillar inner 2a (see FIG. 1) and a hinge pillar outer 2b (see FIG. 2), which are joined to each other, and has a pillar closed cross section which extends vertically.

A dash lower panel 3 is fixed to the both hinge pillars 1, 1, specifically their hinge pillar inners 2a, 2a, so as to partition an engine room ER from a vehicle compartment 4 in a vehicle longitudinal direction. A front pillar 5 is joined to an upper portion of the hinge pillar 1 in such a manner that its front portion is low and its rear portion is high.

Further, a floor panel 6 is fixed to a lower rear end portion of the dash lower panel 3. This floor panel 6 extends rearward substantially horizontally and forms a bottom face of the vehicle compartment 4. As shown in FIG. 3, a tunnel portion 7 which projects toward the inside of the vehicle compartment 4 and extends longitudinally is formed integrally with a central portion of the floor panel 6 in the vehicle width direction. This tunnel portion 7 functions as the center of the vehicle-body rigidity.

As shown in FIGS. 1 and 3, a dash cross member 8 which has a U-shaped cross section extending in the vehicle width direction is joined to a back face of an upper portion of the dash lower panel 3 so as to form a dash-cross closed cross section 8a which extends in the vehicle width direction between this dash cross member 8 and the dash lower panel 3. Thereby, the rigidity of the front vehicle body is increased.

Further, a pair of side sills 9, 9 which extends in the vehicle longitudinal direction is provided at both side portions of the floor panel 6 (herein, only the right-side structure is illustrated) as shown in FIG. 1. This side sill 9 is a vehicle-body rigidity member which is formed by a side sill inner 10 and a side sill outer, which are joined to each other, and has a side-sill closed cross section which extends in the vehicle longitudinal direction.

As shown in FIG. 1, a center pillar 11 extends vertically and connects the side sill 9 and a roof side rail. This center pillar 11 is a vehicle-body rigidity member which is formed by a center pillar inner 12 and a center pillar outer, which are joined to each other, and has a center-pillar closed cross section which extends vertically.

A door opening 13, as an opening of ingress and egress for a passenger, is formed by the hinge pillar 1, front pillar 5, side sill 9 and center pillar 11 as shown in the figure. This door opening 13 is closed by a front door 14.

The above-described front door 14 is pivotally joined to the hinge pillar 1 via upper and lower door hinges 15, 15 at its front end portion as shown in FIG. 2.

Moreover, upper and lower impact bars 16, 17 which extend obliquely in the vehicle longitudinal direction are arranged inside the front door 14 as shown in FIG. 1.

As shown in FIGS. 1 and 3, a dash upper panel 18 is joined to an upper-end bending portion of the dash lower panel 3, and a cowl panel 19 is joined to an upper portion and a front portion of the dash upper panel 18.

As shown in FIGS. 1-3, a suspension tower 20 is arranged at a position which is away from the dash lower panel 3, and an outside face of the suspension tower 20 forms a wheel house of a front wheel (not illustrated).

Further, as shown in FIG. 3, an extension portion 18a which extends forward is formed integrally with a side portion of the dash upper panel 18, and this extension portion 18a is fixed to a rear face portion of a suspension tower top via a connecting member 21 by spot welding or the like.

An apron reinforcement 22 which extends forward from an upper portion of the hinge pillar 1 is provided at an outside portion of the suspension tower 20 as shown in FIGS. 1-3. This apron reinforcement 22 comprises an apron reinforcement outer 23 and an apron reinforcement inner 24 as shown in FIG. 4.

A front side frame 25 is connected to an inside portion of a lower portion of the suspension tower 20 as shown in FIGS. 1-4, and the front side frame 25 extends substantially in parallel to the apron reinforcement 22. The front side frame 25 is a vehicle-body rigidity member which extends in the vehicle longitudinal direction at the both sides of the engine room ER and connects to the suspension tower 20. A rear end portion of this front side frame 25 curves downward and connects to a front portion of the floor frame 26 (see FIGS. 1-3).

The above-described front side frame 25 is joined to a side face portion 20a of the suspension tower 20 at its upper and lower connection flanges 25a, 25b at the A-A section as shown in FIG. 4. Thereby, a closed cross section 27 which extends in the longitudinal direction is formed.

Further, the front side frame 25 is fixed to the lower portion of the dash lower panel 3 as shown in FIGS. 1 and 3.

A plate 28 (see FIGS. 1 and 2) to attach a crush box (not illustrated) which is collapsible in the vehicle longitudinal direction by the impact load is attached to a front end portion of the front side frame 25. A plate-shaped connecting member 29 is attached to this plate 28 so as to extend from the apron reinforcement 22 to a front end portion of the front side frame 25.

Moreover, in the present embodiment, as shown in FIGS. 1-3, a branch frame 30 extends upward and rearward from a suspension-tower disposition position α of the front side frame 25, and this branch frame 30 connects the front side frame 25 and an upper portion of the dash lower panel 3.

The branch frame 30 is, as shown in FIGS. 1-5, arranged on the outside of side face portion 20a of the suspension tower 20, and this is formed so as to have a U-shaped cross section at a position of A-A cross section of FIG. 3 as shown in FIG. 4 and to have a L-shaped cross section at a position of B-B cross section as shown in FIG. 5.

The branch frame 30 comprises, as shown in FIG. 2, a lower end flange 30a which joined to the front side frame 25, a middle upper flange 30b and a middle lower flange 30c which are integrally formed at a middle portion of thereof in the longitudinal direction as shown in FIGS. 2-4, and a rear end flange 30d which is joined to the dash lower panel 3 as shown in FIG. 5.

The branch frame 30 is joined to the outside face of the side face portion 20a of the suspension tower 20 and forms a closed cross section 31 (see FIG. 4) with the side face portion 20a, which continues longitudinally and vertically.

That is, at the sectional position A-A shown in FIG. 4, the middle upper flange 30b and the middle lower flange 30c are joined to the inside face of the side face portion 20a, so that the closed cross section 31 is formed between the side face portion 20a and the branch frame 30.

Meanwhile, at the sectional position B-B shown in FIG. 5, the middle lower flange 30c is joined to the inside face of the side face portion 20a, and the rear end flange 30d is joined to the outside of the upper portion of the dash lower panel 3.

Further, as shown in FIGS. 1, 3 and 5, a branch-frame connection portion β of the dash lower panel 3 (specifically, a specified portion of the rear end flange 30d of the branch frame 30 which connects to the dash lower panel 3) is arranged at almost the same height position as a gusset member 32 which will be described. Moreover, a front end portion of the gusset member 32 and an upper end portion of the branch frame 30 are arranged so as to face to each other via the dash cross member 8 in the present embodiment.

Figure 6:
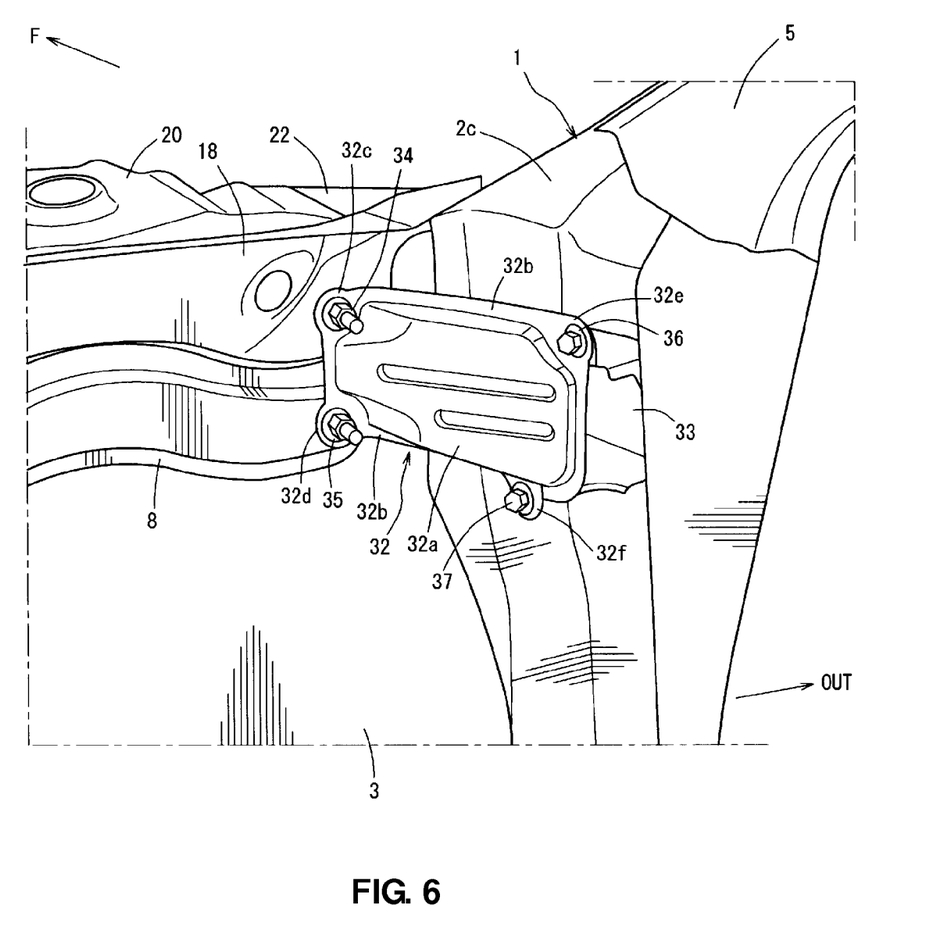
FIG. 6 is a perspective view showing around a gusset member, removing a hinge-pillar inner of a hinge pillar, when viewed from the vehicle inside.

FIG. 6 is a perspective view showing around the gusset member 32, when viewed from the inside of the vehicle compartment. Herein, the structure is illustrated in a state in which the hinge pillar inner 2a of the hinge pillar 1 is removed. The gusset member 32 is arranged on the vehicle inside of the hinge pillar inner 2a as shown in FIGS. 1 and 3. The gusset member 32, as shown in FIGS. 5 and 6, comprises a body portion 32a which has a U-shaped cross section so as to open outward, and flanges 32b which are formed at upper and lower portions of the body portion 32a, and has a hat-shaped cross section as a whole. This gusset member 32 is formed of a steel plate, for example.

The gusset member 32 is arranged so that it extends forward and inward in the vehicle width direction, and connects the hinge pillar inner 2a and the upper end portion of the branch frame 30 via the dash cross member 8 and the gusset member 32.

At the front end portion of the gusset member 32 are formed two attachment portions 32c, 32d with a specified distance vertically between them. The upper attachment portion 32c is arranged at the same height position as the dash upper panel 18. The lower attachment portion 32d is arranged at the same height position as the dash cross member 8.

An attachment portion 32e is formed at a corner portion of the upper flange 32b, and an attachment portion 32f extends downward from the lower flange 32b. The gusset member 32 connects to the hinge reinforcement 33 shown in FIGS. 6 and 7 at the attachment portions 32e, 32f.

Figure 7:
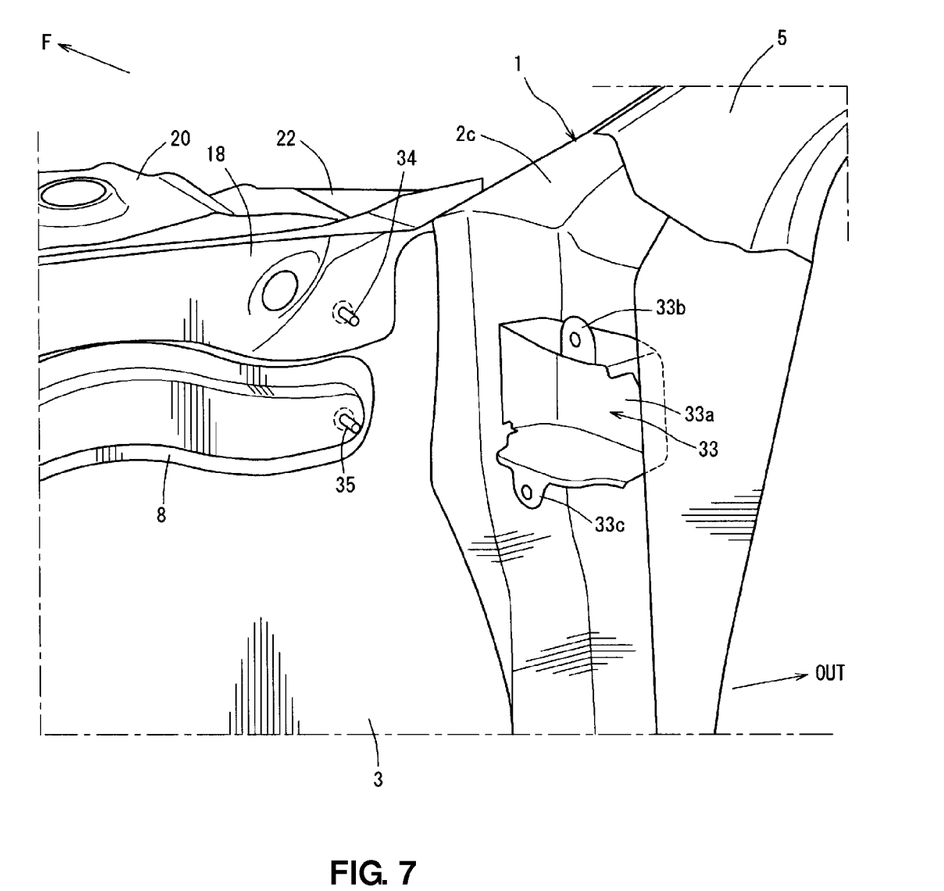
FIG. 7 is a perspective view showing a state in which the gusset member is removed from a state shown in FIG. 6.

FIG. 7 is a perspective view showing a state in which the gusset member 32 is removed from a state shown in FIG. 6. The hinge pillar 1 has a hinge-pillar reinforcement 2c which has a hat-shaped cross section on the vehicle outside of the hinge pillar inner 2a as shown in FIGS. 6 and 7. The hinge reinforcement 33 is provided in a concave space of the hinge-pillar reinforcement 2c.

The hinge reinforcement 33, as shown in FIG. 7, has a projection portion 33a which projects outward, and is formed in a cup shape as a whole, which opens inward, so as to have a sufficient rigidity.

Further, the hinge reinforcement 33 has a pair of upper and lower attachment portions 33b, 33c at its inward portion. The attachment portions 33b, 33c extend toward the hinge pillar inner 2a from the projection portion 33a, and are fixed to the hinge pillar inner 2a.

Herein, the attachment portion 32e is position at a location which corresponds to the upper attachment portion 33b of the hinge reinforcement 33. Meanwhile, the attachment portion 32f is positioned at a location which corresponds to the lower attachment portion 33c of the hinge reinforcement 33.

According to the present embodiment, the hinge reinforcement 33 and the dash panel (dash lower panel 3, dash cross member 8, dash upper panel 18) are connected by the gusset member 32.

This connection between the gusset member 32 and the above-described dash panel is conducted as follows. The upper attachment portion 32c of the gusset member 32 is attached to the dash upper panel 18 with an attaching member 34, such as bolt and nut. The lower attachment portion 32d is attached to the dash cross member 8 with an attaching member 35, such as bolt and nut.

The connection between the gusset member 32 and the hinge reinforcement 33 is conducted as follows. The attachment portion 32e of the gusset member 32 and the attachment portion 33b of the hinge reinforcement 33 are joined via the hinge pillar inner 2a located between them with an attaching member 36, such as bolt and nut. The attachment portion 32f of the gusset member 32 and the attachment portion 33c of the hinge reinforcement 33 are joined via the hinge pillar inner 2a located between them with an attaching member 37, such as bolt and nut.

Herein, the gusset member 32 and the above-described apron reinforcement 22 are arranged almost at the same height position (the gusset member 32 is arranged within a range of the height position of a rearward extension line of the apron reinforcement 22).

Figure 8:
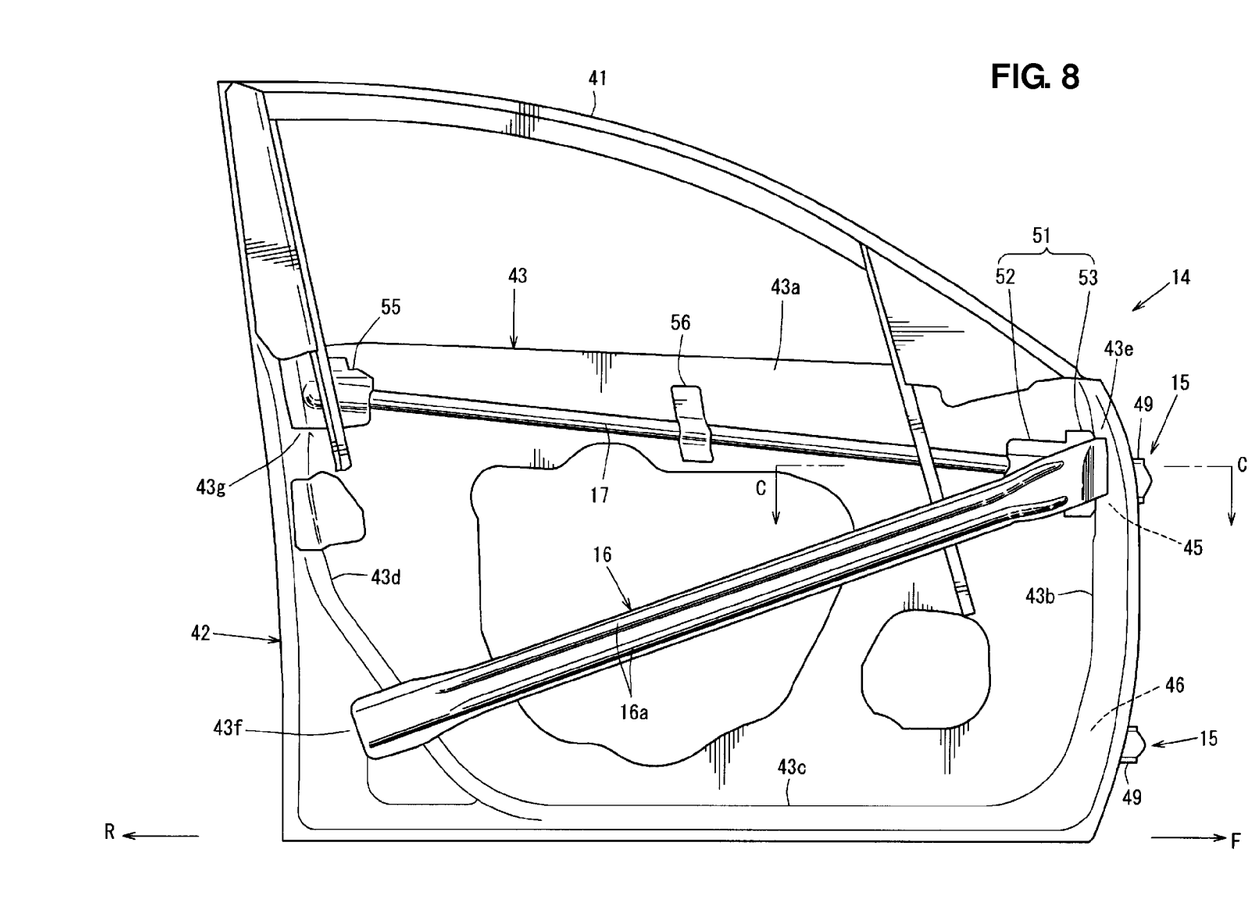
FIG. 8 is a side view of a door structure of the vehicle, removing a door outer panel, when viewed from the vehicle outside.
Figure 9:
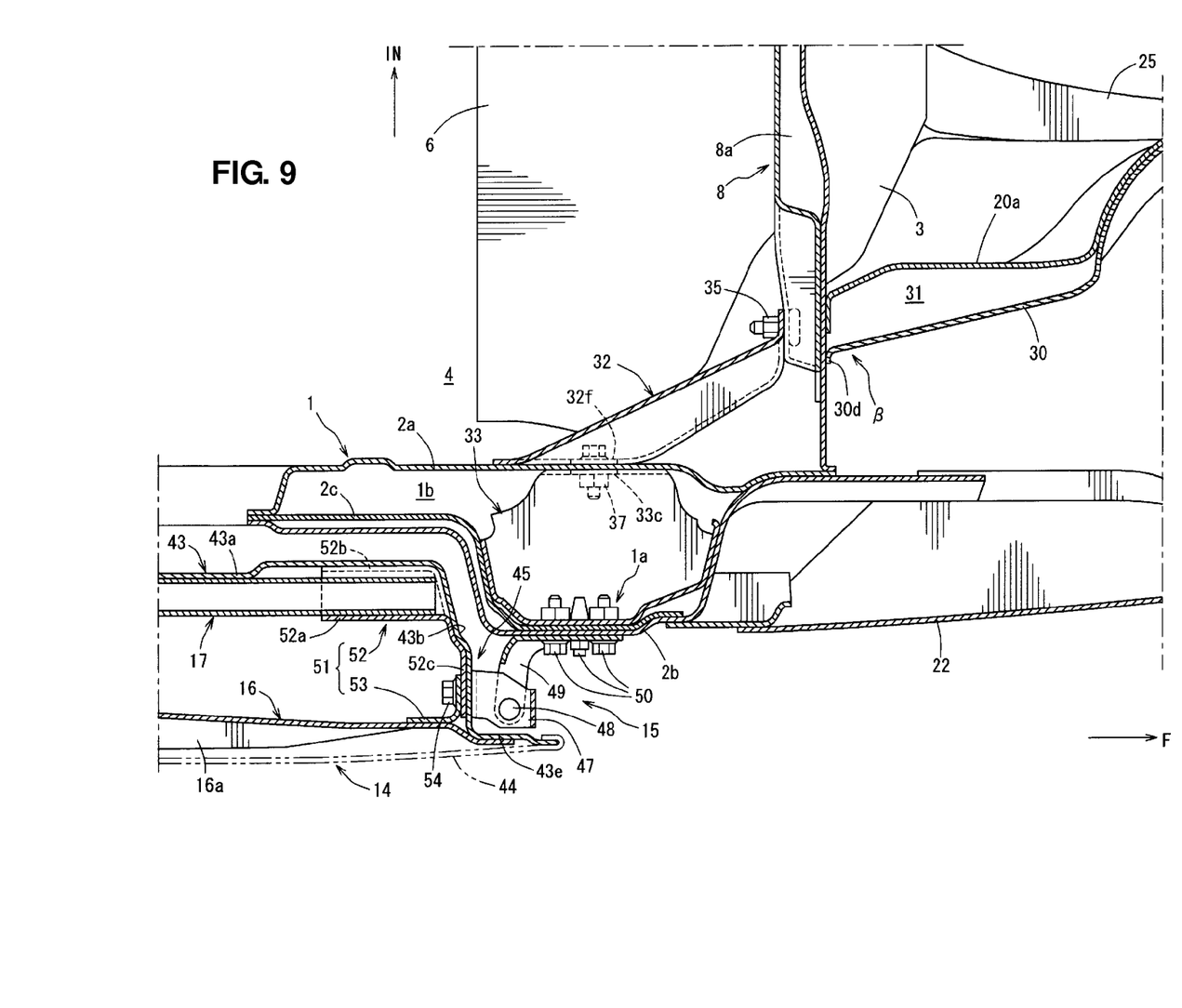
FIG. 9 is a sectional view taken along line C-C of FIG. 9.

Hereinafter, the structure of the front door 14 and its attachment structure will be described referring to FIGS. 8 and 9. FIG. 8 is a side view of the door structure of the vehicle, removing a door outer panel 44, when viewed from the vehicle outside. FIG. 9 is a sectional view taken along line C-C of FIG. 9.

In FIGS. 8 and 9, the front door (the right-side door is illustrated) 14 comprises a door sash portion 41 and a door body 42. The door body 42 comprises a door inner panel 43 located on the vehicle inside and a door outer panel 44 located on the vehicle outside (shown by a two-dotted line in FIG. 9), which are joined together.

The door inner panel 43, as shown in FIGS. 8 and 9, comprises an inner-panel main plate portion 43a, a front side portion 43b which extends outward from a front portion of the inner-panel main plate portion 43a, a lower side portion 43c which extends outward from a lower portion of the inner-panel main plate portion 43a, and a rear side portion 43d which extends outward from a rear portion of the inner-panel main plate portion 43a.

An upper hinge attachment portion 45 and a lower hinge attachment portion 46 are formed at the front side portion 43b of the door inner panel 43 as shown in FIG. 8, and a door-side hinge bracket 47 is attached to these both hinge portions 45, 46 as shown in FIG. 9. The door-side hinge bracket 47 is pivotally coupled to a body-side hinge bracket 49 via a hinge pin 48, which forms the upper and lower door hinges 15, 15.

Herein, door-hinge attachment portions 1*a*, 1*a* (see FIG. 9) are provided at the body-side hinge pillar 1 so as to correspond to the door hinges 15. The body-side hinge bracket 49 is attached to the door-hinge attachment portion 1*a* with an attachment portion 50, such as bolt and nut.

The hinge pillar 1 has a hinge-pillar closed cross section 1*b* which is formed by the hinge pillar inner 2*a*, the hinge pillar reinforcement 2*c* and the hinge pillar outer 2*b*, which are joined together, and extends vertically. In the present embodiment, the above-described hinge pillar reinforcement 33 is joined at a location inside the hinge-pillar closed cross section 1*b* which corresponds to the door-hinge attachment portion 1*a* so as to connect the hinge pillar reinforcement 2*c* and the hinge pillar inner 2*a*. Thereby, the rigidity of the hinge pillar 1 is increased.

Further, the above-described hinge pillar reinforcement 33 is fixed with the above-described attaching member 50 together with the body-side hinge bracket 49, the hinge pillar outer 2*b*, and the hinge pillar reinforcement 2*c* on the vehicle outside. Thus, the support rigidity of the front door 14 is increased by the hinge pillar 1.

Moreover, the upper hinge reinforcement 33 which corresponds to the door-hinge attachment portion 1*a* is connected to the gusset member 32. Thereby, the upper end portion of the branch frame 30 and the upper hinge reinforcement 33 (attachment portions 33*b*, 33*c*) are connected.

Herein, as shown in FIGS. 8 and 9, an extension portion 43*e* which extends forward is formed integrally with an outside portion of the upper hinge attachment portion 45 at the front side portion 43*b* of the door inner panel 43.

Further, as shown in FIGS. 8 and 9, inside the door body 42 are provided the impact bar for side collision 16 which extends rearward from the door hinge 15 at an outward position and the impact bar for frontal collision 17 which extends rearward from the door hinge 15 along a door's beltline portion at an inward position.

As shown in FIG. 8, the impact bar 16 has two beads 16*a*, 16*a* which extend longitudinally. A front end portion of the impact bar 16 is arranged at an outward portion of the front door 14 near the upper hinge attachment portion 45 (door hinge 15). A front end portion of the impact bar 17 is arranged at an inward portion of the front door 14 near the upper hinge attachment portion 45. These front end portions and the upper hinge attachment portion 45 are connected by a connecting bracket 51. In the present embodiment, the connecting bracket 51 comprises a junction 52 and a bracket 53.

The impact bar 17 is made of a steel pipe. The above-described junction 52 is configured to hold the front end portion of the impact bar 17 from the vehicle outside, and fixed to the inner-panel main plate portion 43*a* and the front side portion 43*b* of the door inner panel 43.

The above-described bracket 53, which is made of a steel member having a L shape in a plan view, is connected to the junction 52 and fixed to the front end portion of the impact bar 16.

Herein, as shown in FIG. 9, the door-side hinge bracket 47, the front side portion 43*b* of the door inner panel 43, the junction 52, and the front portion of the bracket 53 are fixed together with a fastening member 54, such as bolt and nut. Thus, the front end portions of the impact bars 16, 17 and the upper hinge attachment portion 45 are connected with the connecting bracket 51 comprising the junction 52 and the bracket 53.

Further, the impact bar 16 is also fixed to the above-described extension portion 43*e* integrally formed with the front side portion 43*b* of the door inner panel 43 in addition to the above-described connecting bracket 51. The front end portions of the impact bars 16, 17 are provided so as to overlap with the upper hinge attachment portion 45 in the vehicle width direction.

The impact bar 16 is diagonally arranged so as to extend from the upper hinge attachment portion 45 to the rear lower portion of the door as shown in FIG. 8. That is, an impact-bar attachment portion 43*f* is formed at the rear lower portion of the door inner panel 43, and the impact bar 16 is obliquely provided so as to extend from the upper hinge attachment portion 45 toward the impact-bar attachment portion 43*f* so that the vertical distance between the impact bars 16, 17 becomes greater toward the vehicle rear.

Meanwhile, the impact bar 17 is arranged obliquely so as to extend upward from the upper hinge attachment portion 45 toward the rear portion of the door. That is, a step portion 43*g* which extends rearward is formed integrally with an outside end of the rear side portion 43*d* of the door inner panel 43. The rear end portion of the impact bar 17 is attached to the rear portion of the door inner panel 43 with a bracket 55 which extends over the inner-panel main plate portion 43*a*, the rear side portion 43*d*, and the step portion 43*g* of the door inner panel 43. Thus, the impact bar 17 extends obliquely from the upper hinge attachment portion 45 toward the rear portion of the door.

A middle portion of the impact bar 17 is supported at the inner-panel main plate portion 43*a* of the door inner panel 43 with a steel impact holder 56 as shown in FIG. 8.

Figure 10:
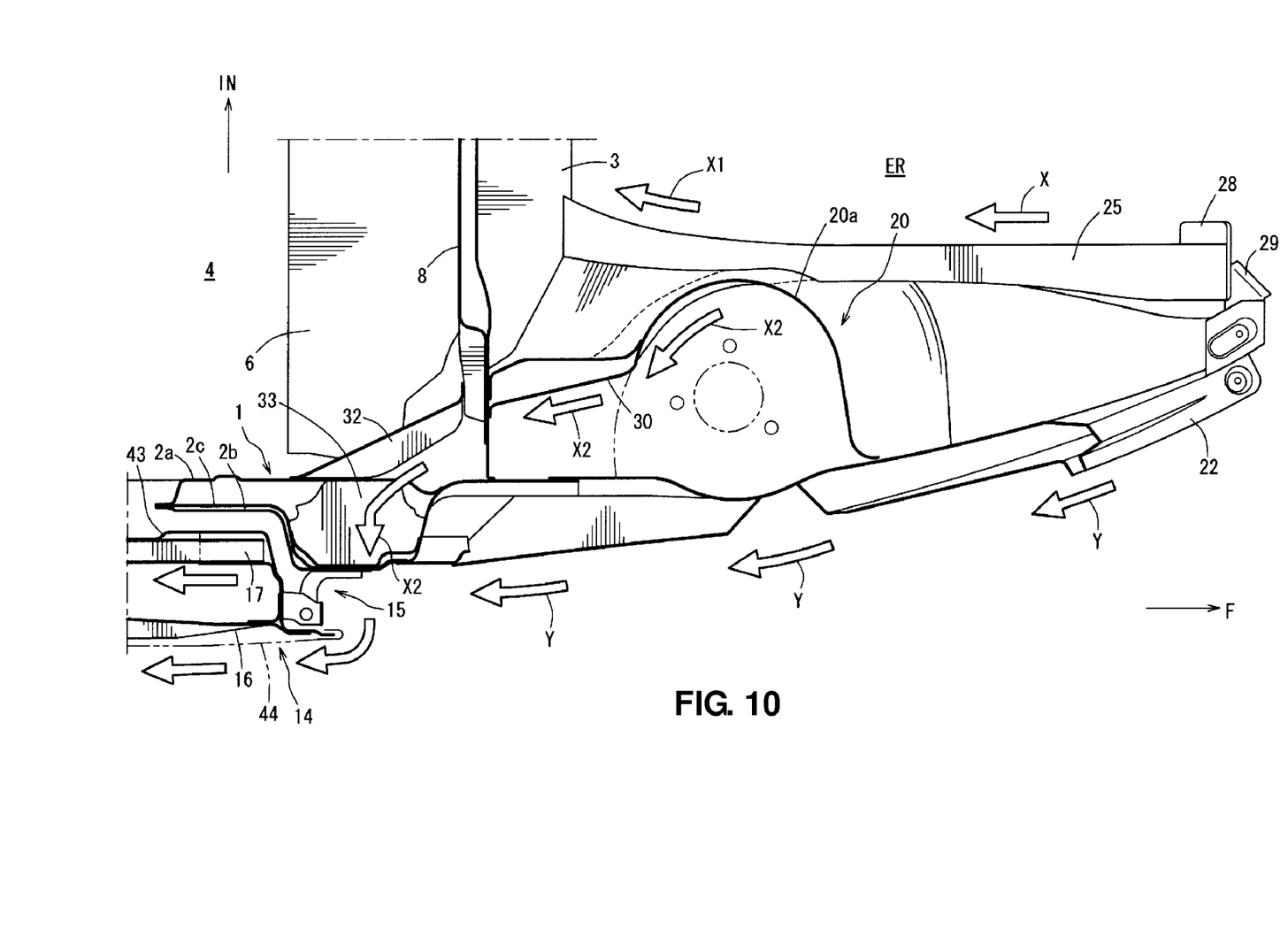
FIG. 10 is an explanatory diagram showing a transmission passage of an impact load.

When the impact load is inputted from the vehicle front at the vehicle frontal collision, part of the impact load is inputted to the front side frame 25 and transmitted rearward as shown by a bold arrow X of FIG. 10. Herein, according to the present embodiment, part of the inputted impact load is transmitted to the vehicle rear portion via the front side frame 25 as shown by a bold arrow X1, and also part of the impact load is transmitted from the front side frame 25 to the gusset member 32 via the branch frame 30 as shown by a bold arrow X2.

The impact load shown by the bold arrow X2 is transmitted from the gusset member 32 to the attachment portions 33*b*, 33*c* of the upper hinge reinforcement 33 (see FIG. 7) via the hinge pillar inner 2*a*. The above-described load is transmitted to the vehicle rear portion via the door hinge 15 and the front door 14 (the door inner panel 43, door outer panel 44, impact bars 16, 17, and so on).

Further, in case of the present embodiment, part of the above-described load is transmitted to the vehicle rear portion via the apron reinforcement 22 which extends almost in parallel to the front side frame 25 as shown by a bold arrow Y in FIG. 10. In this case, the impact load is further transmitted to the vehicle rear portion via the door hinge 15 and the front door 14 as well as the above-described case of the arrow X2.

The impact load transmitted as described above is transmitted to and received by the center pillar 11 (see FIG. 1) vertically extending behind the front pillar 14, for example.

As described above, according to the present embodiment, the impact load is transmitted to the attachment portions 33*b*, 33*c* of the hinge reinforcement 33 via the branch frame 30 and the gusset member 32, so that the impact load can be transmitted or dispersed to the vehicle rear portion properly via the door hinge 15 and the front door 14. Thereby, the deformation of the vehicle compartment 4 can be prevented surely.

Further, the impact load inputted to the font side frame 25 is transmitted to the attachment portions 33*b*, 33*c* of the hinge reinforcement 33 via the branch frame 30 and the gusset member 32, so that the impact load can be transmitted to the attachment portions 33*b*, 33*c* properly with the structure in which the dash panel (dash lower panel 3, dash cross member 8, dash upper panel 18) extends in the vehicle width direction between the branch frame 30 and the gusset member 32.

Moreover, the branch frame 30 is arranged outside the side face portion 20a of the suspension tower 20, so that the branch frame 30 can be arranged by using the dead space, avoiding any interference with various members in the engine room ER. Further, the layout flexibility of the branch frame 30 can be increased by using the dead space outside the side face portion 20a of the suspension tower 20. Thus, the passage of the impact-load transmission from the front side frame 25 to the dash panel can be provided properly.

Further, the upper end portion of the branch frame 30 and the front end portion of the gusset member 32 are arranged on both sides of dash cross member so as to face to each other, so that the connection portion of the branch frame 30 and the gusset member 32 can be reinforced by using the dash cross member 8 extending in the vehicle width direction. Accordingly, deformation of the above-described connection portion can be restrained, so that the impact load can be properly transmitted to the branch frame 30 to the gusset member 32.

Moreover, the impact bars 16, 17 are arranged inside the front door 14 so as to extend rearward from the door hinge 15, so that the impact load inputted from the door hinge 15 can be properly transmitted to the center pillar 11. Thereby, the impact load can be properly received by the center pillar 11 extending vertically, so that the deformation of the vehicle compartment 4 can be restrained more surely.

Herein, the above-described impact bars 16, 17 are arranged inside the front door 14 at the inward and outward positions, the impact load inputted from the door hinge 15 can be surely transmitted to the center pillar 11 by dispersing it inside the door 14.

The impact bars 16, 17 are arranged so that the vertical distance between them becomes greater toward the vehicle rear, so that the impact load can be dispersed not only inside the front door 14 but above and below the front door 14. Thus, the input range of the impact load at the center pillar 11 can be expanded vertically, so that the impact load can be received with a proper dispersion.

Further, as shown by the bold arrow Y in FIG. 10, part of the impact load inputted from the vehicle front is transmitted via the apron reinforcement 22, so that this impact load can be transmitted to the vehicle rear portion with the more proper dispersion. Thereby, the impact-load transmission can be made efficient. Accordingly, the deformation of the vehicle compartment 4 can be restrained more surely.

While the branch frame is formed so as to have the U-shaped cross section and the closed cross section is formed by the branch frame and the side face portion of the suspension tower in the above-described embodiment, the present should not be limited to this embodiment. For example, the branch frame may be formed by a pipe-shaped frame member having a rectangular cross section, and the closed cross section may be formed only by the branch frame.

Further, the present invention should not be limited to the structure in which the branch frame is arranged on the outside of the side face portion of the suspension tower, but the branch frame may be arranged on the inside of the side face portion of the suspension tower as long as there occurs no interference with other members inside the engine room.

What is claimed is:

1. A body structure of a vehicle, comprising:
   a hinge pillar including door-hinge attachment portions which are provided for upper and lower door hinges, the hinge pillar comprising an inner panel and an outer panel which are joined to each other and form a pillar closed cross section;
   a hinge reinforcement provided inside the closed cross section of the hinge pillar including the inner panel and the outer panel at a specified position which corresponds to the upper door-hinge attachment portion of the hinge pillar, the hinge reinforcement including an outer-panel attachment portion which is attached to the outer panel of the hinge pillar and an inner-panel attachment portion which extends toward the inner panel of the hinge pillar and is attached to the inner panel of the hinge pillar; and
   an impact-load transmitting member connecting a front side frame which extends in a vehicle longitudinal direction and the inner panel of the hinge pillar where the inner-panel attachment portion of the hinge reinforcement is attached,
   wherein said impact-load transmitting member and said inner-panel attachment portion of the hinge reinforcement are joined together via the inner panel of the hinge pillar located therebetween.

2. The body structure of a vehicle of claim 1 further comprising a dash panel which partitions an engine room from a vehicle compartment, wherein said impact-load transmitting member comprises a branch frame which connects the front side frame and said dash panel, and a gusset member which connects a branch-frame connection portion of the dash panel and the inner panel of the hinge pillar where the inner-panel attachment portion of the hinge reinforcement.

3. The body structure of a vehicle of claim 2, wherein said branch frame is arranged outside a wheel house.

4. The body structure of a vehicle of claim 2, wherein a dash cross member is provided at said dash panel, and said branch frame and said gusset member are arranged on both sides of dash cross member so as to face to each other.

5. The body structure of a vehicle of claim 1, further comprising a door-side impact-load transmitting member which is arranged inside a door so as to extend rearward from the upper door hinge and connect to a second pillar which extends vertically behind the door.

6. The body structure of a vehicle of claim 5, wherein said door-side impact-load transmitting member comprises plural members which are arranged inside and outside the door hinge in a vehicle width direction, respectively.

7. The body structure of a vehicle of claim 6, wherein said plural door-side impact-load transmitting members are arranged obliquely in a side view so that a vertical distance therebetween becomes greater toward a vehicle rear.

8. The body structure of a vehicle of claim 1, wherein an apron reinforcement which extends forward from an upper portion of said hinge pillar is provided substantially in parallel to the front side frame.

9. A body structure of a vehicle, comprising:
   a hinge pillar including door-hinge attachment portions which are provided for upper and lower door hinges;
   a hinge reinforcement provided at the hinge pillar at a specified position which corresponds to the upper door-hinge attachment portion, the hinge reinforcement including an inner-panel attachment portion which extends toward an inner panel of the hinge pillar and to which the inner panel of the hinge pillar is attached;
   an impact-load transmitting member connecting a front side frame which extends in a vehicle longitudinal direction and the inner-panel attachment portion of the hinge reinforcement to which the inner panel of the hinge pillar is attached; and
   a dash panel which partitions an engine room from a vehicle compartment,
   wherein said impact-load transmitting member comprises a branch frame which connects the front side frame and said dash panel, a gusset member which connects a branch-frame connection portion of the dash panel and the inner-panel attachment portion of said hinge reinforcement, a dash cross member is provided at said dash panel, and said branch frame and said gusset member are arranged on both sides of dash cross member so as to face to each other.

10. A body structure of a vehicle, comprising:
a hinge pillar including a door-hinge attachment portion which is provided for a door hinge;
a hinge reinforcement provided at the hinge pillar at a specified position which corresponds to the door-hinge attachment portion;
an impact-load transmitting member connecting a front side frame which extends in a vehicle longitudinal direction and the hinge reinforcement; and
a dash panel which partitions an engine room from a vehicle compartment,
wherein said impact-load transmitting member comprises a branch frame which connects the front side frame and said dash panel, and a gusset member which connects the dash panel and the hinge reinforcement.

11. The body structure of a vehicle of claim 10, wherein said hinge reinforcement includes an inner-panel attachment portion which extends toward an inner panel of the hinge pillar and to which the inner panel of the hinge pillar is attached, and said gusset member connects a branch-frame connection portion of said dash panel and said inner-panel attachment portion of the hinge reinforcement.

12. The body structure of a vehicle of claim 10, wherein said branch frame is arranged outside a wheel house.

13. The body structure of a vehicle of claim 10, wherein a dash cross member is provided at said dash panel, and said branch frame and said gusset member are arranged on both sides of dash cross member so as to face to each other.

* * * * *